United States Patent
Johnson et al.

(10) Patent No.: US 7,893,151 B2
(45) Date of Patent: Feb. 22, 2011

(54) LIQUID-APPLIED SOUND DAMPING

(75) Inventors: Melissa Merlau Johnson, Ambler, PA (US); Andrew J. Swartz, Fleetwood, PA (US); Drew E. Williams, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 107 days.

(21) Appl. No.: 12/214,637

(22) Filed: Jun. 20, 2008

(65) Prior Publication Data

US 2009/0121174 A1 May 14, 2009

Related U.S. Application Data

(63) Continuation-in-part of application No. 12/004,301, filed on Dec. 20, 2007.

(60) Provisional application No. 61/002,341, filed on Nov. 8, 2007.

(51) Int. Cl.
C08L 41/00 (2006.01)
C08L 85/02 (2006.01)
E04B 1/74 (2006.01)

(52) U.S. Cl. ........................ 524/547; 524/500; 524/610; 252/62

(58) Field of Classification Search .................. 252/62; 524/547, 500, 610
See application file for complete search history.

(56) References Cited

U.S. PATENT DOCUMENTS

| | | | |
|---|---|---|---|
| 5,405,879 A | 4/1995 | Uemae et al. | |
| 5,618,859 A | 4/1997 | Maeyama et al. | |
| 6,492,451 B1 | 12/2002 | Dersch et al. | |
| 6,531,541 B1 | 3/2003 | Desai et al. | |
| 6,576,051 B2 | 6/2003 | Bardman et al. | |
| 6,686,033 B1 | 2/2004 | Chacko | |
| 6,846,889 B1 | 1/2005 | Nakamura et al. | |
| 6,872,761 B2 * | 3/2005 | LeStarge | 523/218 |
| 7,176,258 B2 | 2/2007 | Morihiro et al. | |
| 7,217,746 B2 | 5/2007 | Munro et al. | |
| 7,253,218 B2 * | 8/2007 | Hussaini et al. | 523/223 |
| 2004/0102568 A1 | 5/2004 | Bridgewater et al. | |
| 2004/0229962 A1 | 11/2004 | Morihiro et al. | |
| 2004/0239150 A1 | 12/2004 | Fukudome et al. | |
| 2005/0080193 A1* | 4/2005 | Wouters et al. | 525/191 |
| 2005/0222299 A1 | 10/2005 | Garzon et al. | |
| 2006/0189734 A1 | 8/2006 | Gota et al. | |
| 2006/0189743 A1 | 8/2006 | Sophiea et al. | |
| 2006/0258790 A1 | 11/2006 | Suzuki et al. | |
| 2007/0032586 A1 | 2/2007 | Numazawa et al. | |
| 2007/0048445 A1 | 3/2007 | DiMario | |
| 2007/0048504 A1 | 3/2007 | DiMario | |
| 2007/0049697 A1 | 3/2007 | Miyawaki et al. | |
| 2007/0088121 A1 | 4/2007 | Miyawaki et al. | |

FOREIGN PATENT DOCUMENTS

| | | |
|---|---|---|
| EP | 1398333 | 3/2004 |
| EP | 1398333 A1 * | 3/2004 |
| EP | 1403347 | 3/2004 |
| JP | 3038371 | 2/1991 |
| JP | 3209499 | 9/1991 |
| JP | 3286033 | 12/1991 |
| JP | 6128492 | 5/1994 |
| JP | 6198245 | 7/1994 |
| JP | 6200196 | 7/1994 |
| JP | 7145331 | 6/1995 |
| JP | 7292318 | 11/1995 |
| JP | 9104842 | 4/1997 |
| JP | 9227795 | 9/1997 |
| JP | 10060311 | 3/1998 |
| JP | 10204370 | 8/1998 |
| JP | 10324822 | 12/1998 |
| JP | 11263894 | 9/1999 |
| JP | 2000088939 | 3/2000 |
| JP | 2001064545 | 3/2001 |
| JP | 2001152028 | 6/2001 |
| JP | 2003042223 | 2/2003 |
| JP | 2003193025 | 7/2003 |
| JP | 2003206382 | 7/2003 |
| JP | 2003227542 | 8/2003 |
| JP | 2004115665 | 4/2004 |
| JP | 2004277603 | 10/2004 |
| JP | 2005105106 | 4/2005 |
| JP | 2005126572 | 5/2005 |
| JP | 2005187514 | 7/2005 |
| JP | 2005187605 | 7/2005 |
| JP | 2005281575 | 10/2005 |
| JP | 2006249413 | 9/2006 |
| JP | 2006335918 | 12/2006 |
| JP | 2006335938 | 12/2006 |
| WO | 9906491 | 2/1999 |
| WO | 2007023819 | 3/2007 |

OTHER PUBLICATIONS

"Modified Acrylic Asphalt Vehicle Backing Coat", China Paint, No. 5, p. 26-28, Oct. 2001.
Liu Ruiying, et al., "PS/PA LIPN damping coatings", Paint & Coatings Industry, pp. 4-6, Jun. 30, 1995 [with English Abstract and Section 3.1].

* cited by examiner

*Primary Examiner*—Michael M Bernshteyn
(74) *Attorney, Agent, or Firm*—Cantor Colburn LLP

(57) ABSTRACT

A liquid applied sound damping composition with a binder having from 0.05 wt. % to 20 wt. %, based on the total weight of polymer solids, of carboxy acid monomers, present as copolymerized monomers in pendant polyacid sidechain groups.

12 Claims, No Drawings

LIQUID-APPLIED SOUND DAMPING

This application is a Continuation-in-Part of co-pending U.S. patent application Ser. No. 12/004,301, filed on Dec. 20, 2007; and claims the benefit of priority under 35 U.S.C. §119(e) of U.S. provisional patent application Ser. No. 61/002,341 filed on Nov. 8, 2007.

This invention relates to a composition for sound damping, particularly useful for motor vehicle applications.

Motor vehicle manufacturers in many cases have taken steps to make vehicles that damp sound due to vibration from road noise, engine and transmission vibration, and wind. One of the most common ways to reduce vibration is asphaltic patches, which are thick patches that adhere to metallic or plastic parts of the body or frame. They are fairly effective in damping sound, but cumbersome to use. Firstly, they are labor-intensive to install. Secondly, as each vehicle type has body and frame parts that are different from other vehicle types, the manufacturer has to make available a fairly wide variety of different sizes and shapes of patches. Even a single vehicle can use numerous different sizes and shapes of patches. As a result, the manufacturer has to design, provide and stock a large number of such parts, which is costly and inefficient.

Liquid-applied sound damping materials have been developed. They have some advantages over patches, most notably in that they can be robotically installed with spray equipment, eliminating the labor associated with patch installation.

Also spray installation can allow for more focused or limited application of sound damping material. Laser-assisted vibrational analysis of motor vehicles can identify vibrational "hot spots" (areas that vibrate more than others). With patches, it is sometimes simpler to make and install one large patch that covers several hot spots rather than making and installing several smaller patches. With computer-guided spray equipment, each hot spot can be sprayed (and damped) individually, reducing material usage and vehicle weight.

Liquid-applied sound damping materials that include solvent-borne epoxy or urethane-based materials have obvious drawbacks environmentally for VOC emissions, and contribute to odor issues (e.g., "new car smell").

United States Patent Application Publication No. 2008/0051499 discloses liquid-applied sound damping compositions comprising a copolymer prepared by polymerizing ethylenically unsaturated monomers in the presence of a macromonomer that is comprised of at least 30 mole percent of residues having alternating structural units of donor monomers and acceptor monomers. Despite this disclosure, which addresses the problem of mudcracking, there is a continuing need in the art for improved sound damping performance from such compositions.

This invention is an improved sound damping composition comprising:

(a) a water borne polymeric binder wherein said binder comprises from 0.05 wt. % to 20 wt. %, based on the total weight of polymer solids, of carboxy acid monomers, present as copolymerized monomers in pendant polyacid sidechain groups, wherein the binder has a calculated Tg of between −50° C. and 80° C., preferably between −30° C. and 50° C., and more preferably between 0° C. and 30° C.;

(b) a filler, wherein on a dry weight basis the ratio of filler to polymer is from 1:1 to 10:1; and (c) a thickener in an amount sufficient to achieve a shear-thinnable composition that has a Brookfield viscosity of between 200,000-10,000,000 cP (and preferably between 500,000-3,000,000 cP) when not under shear conditions, wherein the volume solids of the composition is between about 50 to about 75%.

In another embodiment of this invention, the binder (a) comprises two components, a first component comprising a copolymer having a calculated Tg from −50° C. to 60° C. and a second component comprising a copolymer having a calculated Tg from −30° C. to 80° and wherein the difference in Tg between the two components is at least 20° C.

With a two-component binder, one of the components can be polymerized in the presence of the other. Alternatively in a two-component binder, the binder can comprise a blend of two polymeric dispersions.

In a two-component binder the preferred difference in Tg between the two components is from 20-80° C., more preferred from 30-70° C. and most preferred from 40-60° C. The amount of each component in a two-component binder can range from 1-99%, preferably from 5-95% and more preferably from 10-90%.

The composition of this invention has improved composite loss factor ("CLF") characteristics compared to prior aqueous sound damping materials, and virtually eliminates the issues associated with solvent-based liquid-applied sound damping materials.

This invention further is a method for reducing vibration of a motor vehicle comprising applying to one or more components of the vehicle the inventive composition described above.

Another aspect of this invention is an improved sound damping composition comprising:

(a) a water borne polymeric binder wherein said binder comprises from 0.05 wt. % to 20 wt. %, based on the total weight of polymer solids, of carboxy acid monomers, present as copolymerized beta-acryloxypropionic acid monomers, wherein the binder has a calculated Tg of between −50° C. and 80° C., preferably between −30° C. and 50° C., and more preferably between 0° C. and 30° C.;

(b) a filler, wherein on a dry weight basis the ratio of filler to polymer is from 1:1 to 10:1; and (c) a thickener in an amount sufficient to achieve a shear-thinnable composition that has a Brookfield viscosity of between 200,000-10,000,000 cP (and preferably between 500,000-3,000,000 cP) when not under shear conditions, wherein the volume solids of the composition is between about 50 to about 75%.

By "volume solids" we mean the sum of the dry volume of filler plus the dry volume of binder, which sum is divided by the total volume of the composition, multiplied by 100.

As used herein, "wt %", "wt. %" or "wt. percent" means weight percent. Unless otherwise indicated, this means weight percent based on solids.

When we refer to "(co)polymer" we refer to either a homopolymer or copolymer, or both of them in combination. We use the term "(meth)acrylate" to refer to either acrylate or methacrylate and the term "(meth)acrylic" refers to either acrylic or methacrylic.

Herein, the abbreviation AA refers to acrylic acid, and MAA refers to methacrylic acid; oligo-AA refers to oligomers of acrylic acid, and oligo-MAA refers to oligomers of methacrylic acid.

Herein, sulfonic acid monomers includes allylsulfonic acid, styrenesulfonic acid, vinylsulfonic acid, and 2-acrylamido-2-methylpropanesulfonic acid, and salts thereof.

Herein, phosphorus containing monomers includes allylphosphonic acid, vinylphosphonic acid, phosphoethyl methacrylate and other phosphoalkyl methacrylates, and salts thereof.

"Glass transition temperature" or "$T_g$" is the glass transition temperature, of a copolymer calculated with the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, based on weight of monomers charged to the reaction vessel, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The glass transition temperatures of homopolymers for the purposes of this invention are those reported in "Polymer Handbook", edited by J. Brandrup and E. H. Immergut, Interscience Publishers, 1966, unless that publication does not report the $T_g$ of a particular homopolymer, in which case the $T_g$ of the homopolymer is measured by differential scanning colorimetry (DSC). To measure the glass transition temperature of a homopolymer by DSC, the homopolymer sample is prepared and maintained in the absence of ammonia or primary amine. The homopolymer sample is dried, preheated to 120° C., rapidly cooled to −100° C., and then heated to 150° C., at a rate of 20° C./minute while data is collected. The glass transition temperature for the homopolymer is measured at the midpoint of the inflection using the half-height method.

The Fox calculation of the $T_g$ for a copolymer containing crosslinking monomers as polymerized units, is based on glass transition temperatures for the homopolymers formed from each crosslinking monomer wherein the homopolymer is not in the presence of ammonia or a primary amine. The glass transition temperature values for homopolymers formed from the anionic monomers are for anionic homopolymers in the acid form.

For the case in which the emulsion (co)polymer particles are made up of two or more mutually incompatible (co)polymers, the Tg is calculated for each (co)polymer phase according to the component monomers present in each (co)polymer.

When we refer to "Brookfield viscosity," we mean the viscosity of the composition as measured on a Brookfield RV DV-I viscometer with a Brookfield Helipath™ stand utilizing a T-Bar type T-F spindle for compositions with viscosities between 1,000,000 and 10,000,000 cP. For compositions with viscosities between 200,000 and 1,000,000 a T-Bar type T-E spindle may be used. The speed of rotation of the spindle in both cases is 1 rpm and the spindle is run for 10 seconds before the measurement is made. The Brookfield Helipath™ stand allows the spindle to move down into the composition during rotation to ensure proper measurement of highly viscous materials.

The weight average particle diameter of the emulsion (co)polymer particles used in blending can be from 40 nanometers to 1000 nanometers, as measured using a Brookhaven BI-90 Particle Sizer. However, polymodal particle size distributions such as those disclosed in U.S. Pat. Nos. 4,384,056 and 4,539,361, hereby incorporated herein by reference, can be employed.

By "water-borne polymeric binder" we mean an aqueous, water-dispersed polymer that is substantially solvent-free. In a preferred embodiment, the sound damping composition contains the binder in an amount of from 9 wt. % to 50 wt. %, preferably from 14 wt. % to 40 wt. %, even more preferably from 20 wt. % to 33 wt. %, based on solids weight percent of the treating composition. By "solids weight percent," we mean the binder solids weight divided by the total solids in the composition multiplied by 100.

The binder contains a copolymer which includes from 0.05 wt. % to 20 wt. %, preferably 0.1 wt. % to 10 wt. %, more preferably 0.5 wt. % to 5 wt. %, and most preferably 1 wt. % to 3 wt. %, based on the total weight of polymer solids, of carboxy acid monomers, present as copolymerized monomers in pendant polyacid sidechain groups. Preferably, the binder has a calculated Tg of between −30° C. and 50° C.

Polyacid sidechain groups are branches to the polymer backbone that contain at least four units of polymerized ethylenically unsaturated monomer, wherein at least half of the polymerized monomer units have an acid group pendant to the polymer sidechain. Similarly, polyacid groups contain at least four units of polymerized ethylenically unsaturated monomer, wherein at least half of the polymerized monomer units are acid groups. Suitable acid groups include carboxy acids. As used herein, the definitions of polyacid groups and polyacid sidechain groups include salts of these acids. Suitable salts include ammonium salts, alkali metal salts such as sodium and potassium salts, and salts formed from organic bases such as diethanol amine and triethanol amine.

The polyacid sidechain groups may be incorporated into the binder polymer by including an acid macromonomer as one of the monomers in the polymerization to form the binder polymer. As used herein, acid macromonomer refers to an oligomer with a terminal unsaturation and comprising monomers with acid groups as polymerized units. The terminal unsaturation and the section of the acid macromonomer with the acid groups are attached directly or, alternatively, are attached through a linker group. Suitable acid macromonomers are:

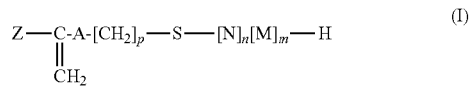 (I)

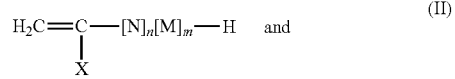 (II)

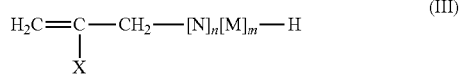 (III)

wherein N is the residue of an ethylenically unsaturated carboxy acid monomer and has the formula:

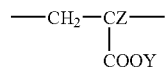

wherein M is the residue of a second ethylenically unsaturated monomer and has the formula

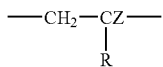

wherein the N and M residues are randomly arranged in the acid macromonomer; wherein m is the total number of M residues in the acid macromonomer and is in the range of 0 to 150; wherein n is the total number of N residues in the acid macromonomer and is in the range of 4 to 300; wherein n is greater than or equal to m; wherein the sum of n and m is in the range of 4 to 300; wherein A is a linker group selected from ester, urethane, amide, amine, and ether linkages; wherein p is in the range of 1 to 20; wherein X is selected from —COOY and R; wherein R is selected from phenyl radicals, substituted phenyl radicals, —CONH$_2$, —CONHR', —CONR'R', —CN, —CCOR', —OCOR', —Cl, and mixtures thereof, wherein R' is an alkyl or alkoxyalkyl radical independently selected from branched, unbranched, or cyclic hydrocarbon radicals having 1 to 18 carbon atoms; wherein Y is independently selected from H, NH$_4$, alkali metals and alkaline earth metals; and wherein each Z is independently selected from H and CH$_3$.

One method to prepare the acid macromonomers is polymerization of at least one ethylenically unsaturated carboxy acid monomer and optionally at least one second ethylenically unsaturated monomer. Regardless of the method of preparation, suitable ethylenically unsaturated carboxy acid monomers include C$_3$-C$_6$ monoethylenically unsaturated monocarboxylic acids, and the alkali metal and ammonium salts thereof, such as, for example, acrylic acid, methacrylic acid, ethacrylic acid, crotonic acid, vinylacetic acid, α-chloroacrylic acid, α-vinylacrylic acid, and beta-acryloxypropionic acid and salts thereof; C$_4$-C$_8$ monoethylenically unsaturated dicarboxylic acids and the alkali metal and ammonium salts thereof, and the anhydrides of the cis-dicarboxylic acids such as, for example, maleic acid, maleic anhydride, itaconic acid, mesaconic acid, fumaric acid, citraconic acid, tetrahydrophthalic anhydrides, cyclohexene dicarboxylic acids and salts thereof; as well as α-phenylacrylic acid, cinnamic acid, chlorocinnamic acid, and β-styrylacrylic acid and salts thereof. Preferred ethylenically unsaturated carboxy acid monomers are acrylic acid and methacrylic acid. The second ethylenically unsaturated monomer includes styrene, vinyltoluene, α-methyl styrene, vinyl naphthalene, vinyl acetate, acrylonitrile, (meth)acrylamide, mono- and di-substituted (meth)acrylamide, various (C$_1$-C$_{20}$)alkyl esters of (meth)acrylic acid; for example, methyl(meth)acrylate, ethyl(meth)acrylate, n-butyl(meth)acrylate, isobutyl(meth)acrylate, 2-ethylhexyl(meth)acrylate, cyclohexyl(meth)acrylate, n-octyl(meth)acrylate, n-decyl(meth)acrylate, n-dodecyl(meth)acrylate, tetradecyl(meth)acrylate, n-amyl(meth)acrylate, lauryl(meth)acrylate, oleyl(meth)acrylate, palmityl(meth)acrylate, and stearyl(meth)acrylate; and other (meth)acrylates such as isobornyl(meth)acrylate, benzyl(meth)acrylate, phenyl(meth)acrylate, and 1-naphthyl(meth)acrylate; alkoxyalkyl(meth)acrylate such as ethoxyethyl(meth)acrylate. The acid macromonomers may optionally contain as polymerized units other acid monomers, such as unsaturated sulfonic acid monomers and phosphorus containing monomers, such as phosphoethyl methacrylate. Alternatively, the polyacid side chains may be made up entirely of sulfonic acid monomers or may be made up entirely of phosphorus containing monomers. Preferably, the acid macromonomers contain as polymerized units from 20 to 100, or from 50 to 100, mole percent ethylenically unsaturated carboxy acid monomer, more preferably from 70 to 100 mole percent, and most preferably from 90 to 100 mole percent of these monomers.

Various conventional polymerization methods are suitable for preparing the acid macromonomers including anionic polymerization as disclosed in U.S. Pat. No. 4,158,736; radical polymerization with chain transfer agents such as cobalt complexes as described in U.S. Pat. No. 5,324,879; catalytic chain transfer polymerization with terminally unsaturated acid macromonomers used as chain transfer agents as described in U.S. Pat. No. 5,362,826; and high temperature radical polymerization as described in U.S. Pat. No. 5,710,227. Alternatively, the terminally unsaturated acid macromonomers of formula I are prepared by conventional radical polymerization using a hydroxy-functional chain transfer agent such as 2-mercaptoethanol or an amine-functional chain transfer agent followed by the reaction of the hydroxyl group or the amine group with an ethylenically unsaturated monomer having a complementary reactive group to attach the terminal unsaturation. Examples of ethylenically unsaturated monomers with a complementary reactive group include glycidyl(meth)acrylate, isocyanatoethyl(meth)acrylate, or (meth)acrylic acid. The ethylenically unsaturated monomers with a complementary reactive group are attached to the fragment of the hydroxy-functional or amine-functional chain transfer agent by various linkages including ether, urethane, amide, amine, urea, or ester linkages. Bulk, solution, and emulsion polymerization using batch, semicontinuous, or continuous processes are suitable for preparation of the acid macromonomers of formulas I, II, and III.

Another method to prepare the acid macromonomers is polymerization of esters of ethylenically unsaturated carboxy acid monomers such as ethyl acrylate, butyl acrylate, or methyl methacrylate followed by the partial or complete hydrolysis of the ester groups to obtain the carboxylic acid functionalities.

Preferably, the acid macromonomer has a number average molecular weight of 200 to 8000, preferably 300 to 5000, and more preferably 300 to 4000. Dividing the number average molecular weight of the macromonomer by the formula molecular mass of the carboxy acid monomer, in the scenario that the macromonomer is a homooligomer, gives an indication of the number of repeat units of the carboxy acid monomer in the macromonomer. When incorporated as polyacid sidechain groups, the acid macromonomer comprises 0.05% to 20%, preferably 0.1% to 10%, more preferably 0.5% to 5%, and most preferably 1% to 3% of the polymer composition by weight. Thus, the water borne polymeric binder comprises 0.05% to 20%, preferably 0.1% to 10%, more preferably 0.5% to 5%, and most preferably 1% to 3%, by weight of acid macromonomer present in pendant polyacid sidechain groups.

In one embodiment of the invention, the binder polymer of this invention is prepared by first preparing a precursor polymer which contains a pendant first co-reactive group which can be reacted with a compound containing a second co-reactive group and a polyacid group. Suitable first co-reactive groups on the precursor polymer are hydroxyl, epoxy, acetoacetoxy and isocyanate groups. For example one can prepare a precursor polymer using hydroxy alkyl(meth)acrylate, glycidyl(meth)acrylate, acetoacetoxy(meth)acrylate, or α,α-dimethyl meta isopropenyl benzyl isocyanate. Suitable second co-reactive groups on the compound including a second co-reactive group and polyacid group are amine, hydroxyl, and phosphoric acid anhydride. In another embodiment of this invention, clustered acid functionality in the polymer is achieved by incorporating beta-acryloxypropionic acid monomer into the binder polymer. Beta-acryloxypropionic acid has terminal unsaturation and thus can be directly incorporated by its inclusion as one of the monomers in the polymerization to form the binder polymer.

In yet another embodiment of this invention, the binder copolymer may also include as copolymerized units at least one ethylenically unsaturated nonionic monomer. By "nonionic monomer" herein is meant that the copolymerized monomer residue does not bear an ionic charge between pH 1 and 14. Suitable ethylenically unsaturated nonionic monomers include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; ureidofunctional monomers; monomers bearing acetoacetate-functional groups; styrene and substituted styrenes; butadiene; ethylene, propylene, $\alpha$-olefins such as 1-decene; vinyl acetate, vinyl butyrate and other vinyl esters; and vinyl monomers such as vinyl chloride, vinylidene chloride.

Amino-Functional Monomers may also be Incorporated.

Although the invention derives advantage from the clustering of the acid functionality provided by the polyacid side chains groups, the presence of other acid functional monomers that are not present in polyacid side chain groups is not precluded. Thus, in a different embodiment of the invention, the binder may contain from 0 to 5%, by weight based on the dry weight of the binder, copolymerized ethylenically unsaturated carboxy acid monomer, or unsaturated sulfonic acid monomer, or phosphorus containing monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, and maleic anhydride; or styrene sulfonic acid; or phosphoethyl methacrylate. Preferred is 0-2% copolymerized ethylenically unsaturated carboxy acid monomer.

In yet still another embodiment of the invention, the binder may contain from 0% to 5%, by weight based on the dry weight of the binder, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

Chain transfer agents can also be used to control molecular weight. We prefer to have the weight average molecular weight of the binder polymer above 20,000 as determined by gel permeation chromatography, using polystyrene standards as is known in the art.

In a further embodiment, the binder polymer comprises two components, a first component comprising a copolymer having a calculated Tg from −50° C. to 60° C. and a second component comprising a copolymer having a calculated Tg from −30° C. to 80° C. wherein the difference in Tg between the two components is at least 20° C. This may be achieved, for example, via a blend of two polymeric dispersions, or alternatively, where one of the components is polymerized in the presence of the other. The polymerization techniques used for preparing the two component binder, also referred to as hard-soft polymer particles with one component having a lower Tg (soft) relative to the other component having a higher Tg (hard), where one component is polymerized in the presence of the other are well known in the art. The hard-soft polymer particles are typically prepared by a multistage aqueous emulsion polymerization process, in which at least two stages differing in composition are polymerized in a sequential fashion. Multi-stage polymerization techniques suitable for preparing the hard-soft polymer particles are disclosed, for example, in U.S. Pat. Nos. 4,325,856, 4,654,397, and 4,814,373. In the multistage polymerization process to prepare the hard-soft polymer used in this present invention, either the soft polymer or the hard polymer is prepared as a dispersion of the first polymer particle in water, followed by the polymerization of the other polymer (the hard polymer or the soft polymer, respectively) in the presence of the first polymer particles to provide the hard-soft particles.

The inventive compositions comprise one or more filler. Examples of fillers include, but are not limited to mineral fillers such as ground and precipitated calcium carbonate, kaolin, calcined, delaminated and structured clay, titanium dioxide, aluminum silicate, magnesium silicate, wollastonite, zinc oxide, iron oxide, magnesium carbonate, amorphous silica, zinc hydroxide, aluminum oxide, aluminum hydroxide, talc, satin white, barium sulfate and calcium sulfate, and combinations of these materials. Fillers useful in this invention can also include various non-coalescing (at least at the temperatures of use) polymeric plastic fillers including, but not limited to solid bead, voided, multi-voided, binder-coated, charged, expandable, etc. and their combinations. Preferably, the filler used in this invention comprises calcium carbonate and/or mica. Calcium carbonate can be ground-type (GCC) or precipitated-type (PCC) of varying particle size, shape and morphologies. The ratio of filler to polymer, on a dry weight basis, is from 1:1 to 10:1, more preferably from 1.5:1 to 6:1, and most preferably from 2:1 to 4:1.

The inventive compositions comprise one or more thickener in an amount sufficient to achieve a shear thinnable composition that has a Brookfield viscosity of between 200,000-10,000,000 when not under shear conditions. A variety of thickeners can be used, singly, or in combination, to produce a shear-thinning composition of this invention: alkali swellable emulsions ("ASE"), hydrophobically-modified alkali swellable emulsions ("HASE"), hydrophobically-modified ethoxylated urethane thickener ("HEUR"), hydroxyethyl cellulose ("HEC"). The advantage of a shear-thinning composition is that once shear is applied to the material by spraying or extruding it (for example), the viscosity drops so it can be applied in such manners. However, upon removal of the shear, the viscosity is very high so the material does not sag and stays in place once it is applied. A preferred ASE thickener is Acrysol™ ASE-60, a preferred HASE thickener is Acrysol™ TT-615 and a preferred HEUR thickener is Acrysol™ RM-12W, all of which are available from the Rohm and Haas Company, Philadelphia, Pa.

The components of the compositions of this invention can be blended together in any order in conventional fashion (e.g., using fan-blade overhead mixer). Optionally, other ingredients and formulation additives as known in the art may be included in these compositions. The composition can optionally be de-aerated under vacuum following blending of the ingredients.

In a particularly preferred embodiment, an acid macromonomer of oligo-AA or oligo-MAA, having number average molecular weight of about 300-4,000, and preferably approximately 3000, is incorporated into an emulsion polymer during emulsion polymerization to give copolymerized units of the carboxy acid monomer that are present in the polymer at a level of approximately 1-3%, preferably about 2%, based on total solids of the polymer. Oligomer A (Example 2) is representative of suitable acid macromonomers, and the polymer prepared in Example 7 is representative of the binder polymer of the inventive composition. Preferably, the binder polymer has a Tg between 0° C.-30° C., more preferably approximately 5° C. The waterborne polymer is formulated into a LASD composition with fillers such as calcium carbonate and mica, resulting in a filler to polymer ratio in the range of from 1.5:1 to 6:1, preferably about 4:1, and a volume solids of approximately 70%. The composition is thickened to the desired viscosity, for example by addition of Acrysol™ ASE-60, to give a viscosity of approximately 1,000,000. Example 19 is representative of the inventive LASD compositions.

Compositions of this invention can be applied to one or more components of a motor vehicle with a spray gun powered with an air compressor using a siphon gun manually, or can be robotically applied using a dispensing robot, as is conventional in the motor vehicle industry.

EXAMPLES

All percentages are weight percentages, unless specified otherwise.

Comparative Example 1

Latex Polymer 1 with 2% MAA

A mixture of monomers was prepared by combining 570 g of deionized water, 50.5 g of a 31% solution of sodium lauryl ether sulfate, 1152 g of butylacrylate, 45 g of methacrylic acid, 1031 g of methyl methacrylate, and 22.3 g n-dodecylmercaptan. The monomer mix was emulsified by mixing under standard conditions. 961 g of deionized water and 2.2 g of the lauryl ether sulfate solution were charged to a five liter flask, and the contents heated to 82-84° C. 138 g of the emulsified monomer mixture was charged to the flask, followed by 60.2 g of a 9% aqueous solution of ammonium persulfate. Following the exotherm, the emulsified monomer mixture and a solution of 2.4 g ammonium persulfate solution and 10.4 g aqueous ammonia (28%) in 88 g water were added linearly and separately over 90 minutes while maintaining the temperature of the contents at 84-86° C. After the completed additions, the contents of the flask were cooled to 65° C. The quantity of remaining monomer was lessened by the sequential addition of aqueous ferrous sulfate, aqueous tertiary butyl hydroperoxide, and isoascorbic acid. The polymer was neutralized to a pH of 9.1 with aqueous ammonia, and Kathon brand LX biocide was added. The product was diluted with deionized water to provide a polymer solids level of 50.5% by weight. The latex had an average particle diameter of 158 nm and a viscosity of 100 cps (centipoise). The calculated Tg is 3.3° C.

Example 2

Oligomer A, 100% MAA, Mn=2808

DI water, 1000 g, was added to a 2 liter flask and heated to 60° C. When the water reached 60° C., 26 mg ([bis[m-[(2,3-butanedione dioximato)(2-)-O:O9]]tetrafluorodiborato(2-)-N,N9,N0,N-]cobalt), CoBF, was charged to the flask followed by a solution of 1.9 g 2,2'-Azobis[2-(2-imidazolin-2-yl)propane]dihydrochloride in 20 g DI water. A mixture of 510 g methyl methacrylate and 20 mg CoBF and a solution of 1.9 g 2,2'-Azobis[2-(2-imidazolin-2-yl)propane]dihydrochloride in 20 g DI water were fed linearly and separately to the flask over 60 minutes. The reaction mixture was held for 120 minutes at 60° C. following the end of the feeds. The reaction mixture was then cooled, dried in a vacuum oven, and crushed to form a powder. The number average molecular weight, Mn, as determined by GPC using acrylic acid standards was 2808.

Example 3

Oligomer B, 100% MAA, Mn=634

DI water, 1000 g, was added to a 2 liter flask and heated to 60° C. When the water reached 60° C., 102 mg ([bis[m-[(2,3-butanedione dioximato)(2-)-O:O9]]tetrafluorodiborato(2-)-N,N9,N0,N-]cobalt), CoBF, was charged to the flask followed by a solution of 1.9 g 2,2'-Azobis[2-(2-imidazolin-2-yl)propane]dihydrochloride in 20 g DI water. A mixture of 510 g methyl methacrylate and 80 mg CoBF and a solution of 1.9 g 2,2'-Azobis[2-(2-imidazolin-2-yl)propane]dihydrochloride in 20 g DI water were fed linearly and separately to the flask over 60 minutes. The reaction mixture was held for 120 minutes at 60° C. following the end of the feeds. The reaction mixture was then cooled, dried in a vacuum oven, and crushed to form a powder. The number average molecular weight, Mn, as determined by GPC using acrylic acid standards was 634.

Example 4

Oligomer C, 100% AA, Mn=482

Oligomer C is a terminally unsaturated homooligomer of acrylic acid and was prepared according to the procedure described in U.S. Pat. No. 5,710,227. The reaction mixture was a 30% aqueous solution of acrylic acid with 3% tert-butylhydroperoxide, by weight based on the weight of acrylic acid, as initiator. The residence time was 8 sec and the reaction temperature was 375° C. The conversion was 92%. The number average molecular weight, Mn, as determined by GPC using acrylic acid standards was 482.

Example 5

Oligomer D, 80% MAA/20% AA

DI water, 1000 g, is added to a 2 liter flask and heated to 60° C. When the water reaches 60° C., 26 mg ([bis[m-[(2,3-butanedione dioximato)(2-)-O:O9]]tetrafluorodiborato(2-)-N,N9,N0,N-]cobalt), CoBF, is charged to the flask followed by a solution of 1.9 g 2,2'-Azobis[2-(2-imidazolin-2-yl)propane]dihydrochloride in 20 g DI water. A mixture of 408 g methyl methacrylate, 102 g acrylic acid and 20 mg CoBF, and a solution of 1.9 g 2,2'-Azobis[2-(2-imidazolin-2-yl)propane]dihydrochloride in 20 g DI water are fed linearly and separately to the flask over 60 minutes. The reaction mixture is held for 120 minutes at 60° C. following the end of the feeds. The reaction mixture is then cooled, dried in a vacuum oven, and crushed to form a powder. The number average molecular weight, Mn, as determined by GPC using acrylic acid standards is expected to be 1800.

Example 6

Oligomer E, 80% MAA/20% MMA

A mixture of 426 g methyl methacrylate and 25 mg bis-{(2,3-butanedione dioximato)(1-)N,N'](1-cyano-1-methylethyl)(pyridine)cobalt(III) in 600 mL benzene with 2.0 g Azobisisobutyronitrile is heated at 60° C. for 36 hours. Methanol, 200 g, and 381 g aqueous potassium hydroxide (50% active) is added to the reaction mixture which is heated at reflux for 5 hours. DI water, 400 g, is added and the benzene and alcohol removed by azeotropic distillation to yield an aqueous solution polymer which is dried and crushed. The resultant polymer composition is expected to be 20% methyl methacrylate and 80% methacrylic acid. The number average molecular weight, Mn, as determined by GPC using acrylic acid standards is expected to be 1800.

Example 7

Latex Polymer 2 Containing 2% Oligomer A

A mixture of monomers was prepared by combining 143 g of deionized water, 12.6 g of a 31% aqueous solution of sodium lauryl ether sulfate, 288 g of butylacrylate, 11.3 g of oligomer A, 258 g of methyl methacrylate, and 5.6 g n-dodecylmercaptan. The monomer mix was emulsified by mixing under standard conditions. 240.3 g of deionized water and 0.55 g of the lauryl ether sulfate solution were charged to a two liter flask, and the contents heated to 82-84° C. 34.5 g of the emulsified monomer mixture was charged to the flask, followed by 15.1 g of a 9% aqueous solution of ammonium persulfate. Following the exotherm, the emulsified monomer mixture and a solution of 0.6 g ammonium persulfate solution and 2.6 g aqueous ammonia (28%) in 22 g water were added linearly and separately over 90 minutes while maintaining the temperature of the contents at 84-86° C. After the completed additions, the contents of the flask were cooled to 65° C. The quantity of remaining monomer was lessened by the sequential addition of aqueous ferrous sulfate, aqueous tertiary butyl hydroperoxide, and isoascorbic acid. The polymer was neutralized to a pH of 7.3 with aqueous ammonia, and Kathon brand LX biocide was added. The product was diluted with deionized water to provide a polymer solids level of 50.5% by weight. The latex had an average particle diameter of 247 nm and a viscosity of 100 cps (centipoise). The calculated Tg is 3.3° C.

Example 8

Latex Polymer 3 Containing 2% Oligomer B

A mixture of monomers is prepared by combining 143 g of deionized water, 12.6 g of a 31% aqueous solution of sodium lauryl ether sulfate, 288 g of butylacrylate, 11.3 g of oligomer B, 258 g of methyl methacrylate, and 5.6 g n-dodecylmercaptan. The monomer mix is emulsified by mixing under standard conditions. 240.3 g of deionized water and 0.55 g of the lauryl ether sulfate solution are charged to a two liter flask, and the contents heated to 82-84° C. 34.5 g of the emulsified monomer mixture is charged to the flask, followed by 15.1 g of a 9% aqueous solution of ammonium persulfate. Following the exotherm, the emulsified monomer mixture and a solution of 0.6 g ammonium persulfate solution and 2.6 g aqueous ammonia (28%) in 22 g water are added linearly and separately over 90 minutes while maintaining the temperature of the contents at 84-86° C. After the completed additions, the contents of the flask are cooled to 65° C. The quantity of remaining monomer is lessened by the sequential addition of aqueous ferrous sulfate, aqueous tertiary butyl hydroperoxide, and isoascorbic acid. The polymer is neutralized to a pH of 8.0 with aqueous ammonia, and Kathon brand LX biocide is added. The product is diluted with deionized water to provide a polymer solids level of 50.5% by weight. The latex is expected to have an average particle diameter of 250 nm and a viscosity of 100 cps (centipoise). The calculated Tg is 3.3° C.

Example 9

Latex Polymer 4 Containing 8% Oligomer A

A mixture of monomers is prepared by combining 143 g of deionized water, 12.6 g of a 31% aqueous solution of sodium lauryl ether sulfate, 293 g of butylacrylate, 44.6 g of oligomer A, 220 g of methyl methacrylate, and 5.6 g n-dodecylmercaptan. The monomer mix is emulsified by mixing under standard conditions. 240.3 g of deionized water and 0.55 g of the lauryl ether sulfate solution are charged to a two liter flask, and the contents heated to 82-84° C. 34.5 g of the emulsified monomer mixture is charged to the flask, followed by 15.1 g of a 9% aqueous solution of ammonium persulfate. Following the exotherm, the emulsified monomer mixture and a solution of 0.6 g ammonium persulfate solution and 2.6 g aqueous ammonia (28%) in 22 g water are added linearly and separately over 90 minutes while maintaining the temperature of the contents at 84-86° C. After the completed additions, the contents of the flask are cooled to 65° C. The quantity of remaining monomer is lessened by the sequential addition of aqueous ferrous sulfate, aqueous tertiary butyl hydroperoxide, and isoascorbic acid. The polymer is neutralized to a pH of 8.0 with aqueous ammonia, and Kathon brand LX biocide is added. The product is diluted with deionized water to provide a polymer solids level of 50.5% by weight. The latex is expected to have an average particle diameter of 200 mu and a viscosity of 100 cps (centipoise). The calculated Tg is 3.3° C.

Example 10

Latex Polymer 5 Containing 2% Oligomer C

A mixture of monomers is prepared by combining 117 g of deionized water, 12.6 g of a 31% aqueous solution of sodium lauryl ether sulfate, 283 g of butylacrylate, 37.7 g of oligomer C (30% solids), 264 g of methyl methacrylate, and 5.6 g n-dodecylmercaptan. The monomer mix is emulsified by mixing under standard conditions. 240.3 g of deionized water and 0.55 g of the lauryl ether sulfate solution are charged to a two liter flask, and the contents heated to 82-84° C. 34.5 g of the emulsified monomer mixture is charged to the flask, followed by 15.1 g of a 9% aqueous solution of ammonium persulfate. Following the exotherm, the emulsified monomer mixture and a solution of 0.6 g ammonium persulfate solution and 2.6 g aqueous ammonia (28%) in 22 g water are added linearly and separately over 90 minutes while maintaining the temperature of the contents at 84-86° C. After the completed additions, the contents of the flask are cooled to 65° C. The quantity of remaining monomer is lessened by the sequential addition of aqueous ferrous sulfate, aqueous tertiary butyl hydroperoxide, and isoascorbic acid. The polymer is neutralized to a pH of 8.0 with aqueous ammonia, and Kathon brand LX biocide is added. The product is diluted with deionized water to provide a polymer solids level of 50.5% by weight. The final latex is expected to have an average particle diameter of 250 nm and a viscosity of 100 cps (centipoise). The calculated Tg is 3.3° C.

Example 11

Latex Polymer 6 Containing 2% Oligomer D

A mixture of monomers is prepared by combining 143 g of deionized water, 12.6 g of a 31% aqueous solution of sodium lauryl ether sulfate, 288 g of butylacrylate, 11.3 g of oligomer D, 258 g of methyl methacrylate, and 5.6 g n-dodecylmercaptan. The monomer mix is emulsified by mixing under standard conditions. 240.3 g of deionized water and 0.55 g of the lauryl ether sulfate solution are charged to a two liter flask, and the contents heated to 82-84° C. 34.5 g of the emulsified monomer mixture is charged to the flask, followed by 15.1 g of a 9% aqueous solution of ammonium persulfate. Following the exotherm, the emulsified monomer mixture and a solution of 0.6 g ammonium persulfate solution and 2.6 g aqueous ammonia (28%) in 22 g water are added linearly and separately over 90 minutes while maintaining the temperature of the contents at 84-86° C. After the completed additions, the contents of the flask are cooled to 65° C. The quantity of remaining monomer is lessened by the sequential addition of aqueous ferrous sulfate, aqueous tertiary butyl hydroperoxide, and isoascorbic acid. The polymer is neutralized to a pH of 8.0 with aqueous ammonia, and Kathon brand LX biocide is added. The product is diluted with deionized water to provide a polymer solids level of 50.5% by weight. The latex is expected to have an average particle diameter of 247 nm and a viscosity of 100 cps (centipoise). The calculated Tg is 2.4° C.

Example 12

Latex Polymer 7 Containing 2% Oligomer E

A mixture of monomers is prepared by combining 143 g of deionized water, 12.6 g of a 31% aqueous solution of sodium lauryl ether sulfate, 288 g of butylacrylate, 11.3 g of oligomer E, 258 g of methyl methacrylate, and 5.6 g n-dodecylmercaptan. The monomer mix is emulsified by mixing under standard conditions. 240.3 g of deionized water and 0.55 g of the lauryl ether sulfate solution are charged to a two liter flask, and the contents heated to 82-84° C. 34.5 g of the emulsified monomer mixture is charged to the flask, followed by 15.1 g of a 9% aqueous solution of ammonium persulfate. Following the exotherm, the emulsified monomer mixture and a solution of 0.6 g ammonium persulfate solution and 2.6 g aqueous ammonia (28%) in 22 g water are added linearly and separately over 90 minutes while maintaining the temperature of the contents at 84-86° C. After the completed additions, the contents of the flask are cooled to 65° C. The quantity of remaining monomer is lessened by the sequential addition of aqueous ferrous sulfate, aqueous tertiary butyl hydroperoxide, and isoascorbic acid. The polymer is neutralized to a pH of 8.0 with aqueous ammonia, and Kathon brand LX biocide is added. The product is diluted with deionized water to provide a polymer solids level of 50.5% by weight. The latex is expected to have an average particle diameter of 247 nm and a viscosity of 100 cps (centipoise). The calculated Tg is 2.4° C.

Example 13

Latex Polymer 8 Containing 4% AOPA

A mixture of monomers is prepared by combining 143 g of deionized water, 12.6 g of a 31% aqueous solution of sodium lauryl ether sulfate, 280 g of butylacrylate, 22.3 g of β-acryloxypropionic acid (AOPA), 255 g of methyl methacrylate, and 5.6 g n-dodecylmercaptan. The monomer mix is emulsified by mixing under standard conditions. 240.3 g of deionized water and 0.55 g of the lauryl ether sulfate solution are charged to a two liter flask, and the contents heated to 82-84° C. 34.5 g of the emulsified monomer mixture is charged to the flask, followed by 15.1 g of a 9% aqueous solution of ammonium persulfate. Following the exotherm, the emulsified monomer mixture and a solution of 0.6 g ammonium persulfate solution and 2.6 g aqueous ammonia (28%) in 22 g water are added linearly and separately over 90 minutes while maintaining the temperature of the contents at 84-86° C. After the completed additions, the contents of the flask are cooled to 65° C. The quantity of remaining monomer is lessened by the sequential addition of aqueous ferrous sulfate, aqueous tertiary butyl hydroperoxide, and isoascorbic acid. The polymer is neutralized to a pH of 8 with aqueous ammonia, and Kathon brand LX biocide is added. The product is diluted with deionized water to provide a polymer solids level of 50.5% by weight. The latex is expected to have an average particle diameter of 160 nm and a viscosity of 100 cps (centipoise). The calculated Tg is 3.3° C.

Example 14

Two Component Latex Polymer 9 Containing 1% Oligomer A

A 5 L, four necked round bottom flask is equipped with paddle stirrer, thermometer, nitrogen inlet, and reflux condenser. DI water, 961 g, is added to the kettle and heated to 84° C. under a nitrogen atmosphere. To the heated kettle water is added 2.2 g sodium salt of lauryl alcohol ether sulfate, 138 g of monomer mix 1, and 5.5 g of ammonium persulfate dissolved in 55 g of DI water. Following the exotherm, the remainder of monomer mix 1 is added to the kettle at a temperature of 83° C. along with 2.35 g ammonium persulfate and 10.4 g of ammonium hydroxide in 88 g of DI water (cofeed solution). When the addition of monomer mix 1 is completed, monomer mix 2 is added to the reactor while the cofeed solution is continued. The total feed time for monomer mix 1 and monomer mix 2 is 90 minutes. Upon completion of the feeds, the batch is held for 30 minutes at 85° C. then 10 g of ferrous sulfate solution (0.15% in water), 1.5 g of Versene solution (1% in water), a total of 4 g t-butylhydroperoxide (70%) dissolved in 40 g water, and a total of 2.6 g of isoascorbic acid dissolved in 40 g of water are added. Ammonium hydroxide is added to raise the pH to 9.0. The product is diluted with deionized water to provide a polymer solids level of 50.5% by weight. The final latex is expected to have an average particle size of 250 nm and a viscosity of 100 cps.

|  | grams |
|---|---|
| Monomer Mix 1 | |
| DI water | 285 |
| sodium lauryl ether sulfate (31%) | 25.2 |
| butyl acrylate | 724 |
| n-dodecylmercaptan | 11.2 |
| methyl methacrylate | 368 |
| Oligomer A | 22.3 |
| Monomer Mix 2 | |
| DI water | 285 |
| sodium lauryl ether sulfate (31%) | 25.2 |
| butyl acrylate | 312 |
| n-dodecylmercaptan | 11.2 |
| methyl methacrylate | 780 |
| methacrylic acid | 22.3 |

Example 15

Two Component Latex Polymer 10 Containing 2% Oligomer A

A 5 L, four necked round bottom flask is equipped with paddle stirrer, thermometer, nitrogen inlet, and reflux condenser. DI water, 961 g, is added to the kettle and heated to 84° C. under a nitrogen atmosphere. To the heated kettle water is added 2.2 g sodium salt of lauryl alcohol ether sulfate, 138 g of monomer mix 3, and 5.5 g of ammonium persulfate dissolved in 55 g of DI water. Following the exotherm, the remainder of monomer mix 3 is added to the kettle at a temperature of 83° C. along with 2.35 g ammonium persulfate and 10.4 g of ammonium hydroxide in 88 g of DI water (cofeed solution). When the addition of monomer mix 3 is completed, monomer mix 4 is added to the reactor while the cofeed solution is continued. The total feed time for monomer mix 3 and monomer mix 4 is 90 minutes. Upon completion of the feeds, the batch is held for 30 minutes at 85° C. then 10 g of ferrous sulfate solution (0.15% in water), 1.5 g of Versene solution (1% in water), a total of 4 g t-butylhydroperoxide (70%) dissolved in 40 g water, and a total of 2.6 g of isoascorbic acid dissolved in 40 g of water are added. Ammonium hydroxide is added to raise the pH to 9.0. The product is diluted with deionized water to provide a polymer solids level of 50.5% by weight. The final latex is expected to have an average particle size of 250 nm and a viscosity of 100 cPs.

|  | grams |
|---|---|
| Monomer Mix 3 | |
| DI water | 285 |
| sodium lauryl ether sulfate (31%) | 25.2 |
| butyl acrylate | 724 |
| n-dodecylmercaptan | 11.2 |
| methyl methacrylate | 368 |
| Oligomer A | 22.3 |
| Monomer Mix 4 | |
| DI water | 285 |
| sodium lauryl ether sulfate (31%) | 25.2 |
| butyl acrylate | 312 |
| n-dodecylmercaptan | 11.2 |
| methyl methacrylate | 780 |
| Oligomer A | 22.3 |

Examples 16-21

Coating Formulations and Composite Loss Factor

The ingredients used in the table below are the binders from Examples 1 and 7; Foamaster™ Nopco NXZ obtained from Cognis (Cincinnati, Ohio); Tamol™ 1254 dispersant and UCD 1530E black colorant both available from the Rohm and Haas Company (Philadelphia, Pa.); Omyacarb 40 (calcium carbonate) available from Omya, Inc. (Alpharetta, Ga.); Mica 325 (mica) available from Asheville Mica Company (Newport News, Va.); and Acrysol™ ASE-60, a thickener (alkali-swellable emulsion, ASE) also available from the Rohm and Haas Company (Philadelphia, Pa.). These materials were used to make the following coating formulations (Table 1, amounts in grams).

Composite loss factor ("CLF") calculations at various temperatures were conducted following the ASTM E-756 test method on a 1.6 mm thick bar. Dry coating weights of 4.0 kg/m² were applied for examples 16-21. After wet coating application, the bars were allowed to sit at room temperature for 10 minutes, followed by 20 minutes in a 150° C. oven to dry the bars. Upon cooling, the bars were measured for coating coverage and tested as mentioned above. The CLF values (unitless) reported represent the average of 3 test bar specimens.

TABLE 1

Liquid Applied Sound Damping Coating Compositions

| | Composition | | | | | |
|---|---|---|---|---|---|---|
| | Ex. 16 | Ex. 17 | Ex. 18 | Ex. 19 | Ex. 20 | Ex. 21 |
| Latex from Ex. 1 | 41.16 | | 32.02 | | 22.05 | |
| Latex from Ex. 7 | | 41.16 | | 32.02 | | 22.05 |
| Nopco ™ NXZ | 0.17 | 0.17 | 0.17 | 0.17 | 0.16 | 0.16 |
| Tamol 1254 ™ | 0.49 | 0.49 | 0.57 | 0.57 | 0.61 | 0.61 |
| UCD 1530E Black | 0.52 | 0.52 | 0.51 | 0.51 | 0.46 | 0.46 |
| Omyacarb 40 | 42.17 | 42.17 | 57.89 | 57.89 | 62.02 | 62.02 |
| Mica-325 | 14.70 | 14.70 | 8.08 | 8.08 | 8.65 | 8.65 |
| ASE-60/H2O (50/50) | 0.79 | 0.79 | 0.77 | 0.77 | 0.46 | 0.46 |
| Water | 0.00 | 0.00 | 0.00 | 0.00 | 5.60 | 5.60 |
| Total | 100.00 | 100.00 | 100.00 | 100.00 | 100.00 | 100.00 |

TABLE 2

Composite Loss Factor Data for Liquid Applied Sound Damping Compositions
Composite Loss Factor Data (unitless)

| Temperature (° C.) | Ex. 16 | Ex. 17 | Ex. 18 | Ex. 19 | Ex. 20 | Ex. 21 |
|---|---|---|---|---|---|---|
| 0 | 0.04 | 0.05 | 0.03 | 0.05 | 0.03 | 0.04 |
| 15 | 0.10 | 0.13 | 0.08 | 0.12 | 0.07 | 0.10 |
| 30 | 0.22 | 0.24 | 0.19 | 0.23 | 0.18 | 0.20 |
| 45 | 0.10 | 0.09 | 0.09 | 0.09 | 0.10 | 0.10 |
| 60 | 0.05 | 0.05 | 0.04 | 0.05 | 0.05 | 0.05 |

Table 1 shows LASD compositions that can be compared as three sets of pairs; compositions comprising the latex polymer of Example 7 represent inventive compositions, and the compositions comprising the latex polymer of Example 1 represent comparative compositions, each polymer being formulated at three different filler to polymer ratios (2.6:1 for Examples 16-17; 4.1:1 for Examples 18-19, and 6.2:1 for Examples 20-21). This provides a pair of inventive and comparative compositions at each filler level such that each pair is identically formulated and differ only in the constituent polymer. The polymers, in turn, have the same monomers and also have the same quantities of each monomer, but differ in the manner in which the acid functionality is distributed in the latex polymer particle. That is, the inventive compositions (Examples 17, 19 and 21) comprise carboxy acid monomers, present as copolymerized monomers in pendant polyacid sidechain groups, resulting in carboxy acid groups that are clustered. On the other hand, the comparative compositions (Examples 16, 18 and 20) comprise the same total amount of carboxy acid monomers, but these are randomly distributed throughout the polymer (and not clustered) during the course of the emulsion polymerization.

Table 2 shows the composite loss factor (CLF) data for these LASD compositions throughout a range of temperatures that are meaningful for the end use application of the coating. For manufacturers, the most important temperature range is centered around the most common temperature of use for the coating, which for vehicle interior sound damping is around 15° C. to 40° C. For each composition, if CLF (y axis) is plotted against temperature (x axis), the CLF goes through a maximum as measured at temperatures ranging from 0° C. to 60° C. At the low temperature and high temperature extremes, the damping is predominantly related to the bulk/thickness of the coating material and the filler to polymer ratio, and it is relatively independent of the polymer; but in the region of maximum CLF, which corresponds to temperatures of 15° C. to 30° C., for each pair the CLF is significantly higher for the inventive compositions compared to the comparative compositions. At these filler levels, compared to the comparative compositions, the inventive compositions show damping that is generally increased by some 30-50% at 15° C., and increased by some 10-20% at 30° C.

We claim:

1. A composition comprising:
   (a) a water borne polymeric binder wherein said binder comprises from 0.05 wt. % to 20 wt. %, based on the total amount of polymer solids, of carboxy acid monomers, present as copolymerized monomers in pendant polyacid sidechain groups, wherein the binder has a calculated Tg of between −50° C. and 80° C.;
   (b) a filler, wherein on a dry weight basis the ratio of filler to polymer is from 1:1 to 10:1; and
   (c) a thickener in an amount sufficient to achieve a shear thinnable composition that has a Brookfield viscosity of between 200,000-10,000,000 cP when not under shear conditions
   wherein the volume solids of the composition is between about 50 to about 75%.

2. The composition of claim 1 wherein the binder has a calculated Tg of between −30° C. and 50° C.

3. The composition of claim 1 wherein the binder has a calculated Tg of between 0° C.-30° C. and wherein the composition has a Brookfield viscosity of from 1,000,000-3,000,000 cP.

4. The composition of claim 1 wherein the binder comprises two components, a first component comprising a copolymer having a calculated Tg from −50° C. to 60° C. and a second component comprising a copolymer having a calculated Tg from −30° C. to 80° C. wherein the difference in Tg between the two components is at least 20° C.

5. The composition of claim 4 wherein one of the components is polymerized in the presence of the other.

6. The composition of claim 4 wherein the components comprise a blend of two polymeric dispersions.

7. A method for reducing vibration of a motor vehicle comprising applying to one or more components of the vehicle a composition comprising:
   (a) a water borne polymeric binder wherein said binder comprises from 0.1 wt. % to 10 wt. %, based on the total weight of polymer solids, of carboxy monomers in pendant polyacid sidechain groups, wherein the binder has a calculated Tg of between −50° C. and 80° C.;
   (b) a filler, wherein on a dry weight basis the ratio of filler to polymer is from 1:1 to 10:1; and
   (c) a thickener in an amount sufficient to achieve a shear-thinnable composition that has a Brookfield viscosity of between 200,000-10,000,000 cP when not under shear conditions
   wherein the volume solids of the composition is between about 50 to about 75%.

8. A composition comprising:
   (a) a water borne polymeric binder wherein said binder comprises from 0.05 wt. % to 20 wt. %, based on the total amount of polymer solids, of carboxy acid monomers, present as copolymerized beta-acryloxypropionic acid monomers, wherein the binder has a calculated Tg of between −50° C. and 80° C.;
   (b) a filler, wherein on a dry weight basis the ratio of filler to polymer is from 1:1 to 10:1; and
   (c) a thickener in an amount sufficient to achieve a shear thinnable composition that has a Brookfield viscosity of between 200,000-10,000,000 cP when not under shear conditions
   wherein the volume solids of the composition is between about 50 to about 75%.

9. The composition of claim 1, wherein the composition has a composite loss factor of at least 0.20 at 30° C. as measured in accordance with ASTM E-756 test method when applied to a 1.6 mm thick bar surface at a dry coating weight of 4.0 kg/m$^2$.

10. The composition of claim 1, wherein the filler is selected from the group consisting of ground calcium carbonate, precipitated calcium carbonate, kaolin, calcined clay, delaminated clay, structured clay, aluminum silicate, magnesium silicate, wollastonite, zinc oxide, iron oxide, magnesium carbonate, amorphous silica, zinc hydroxide, aluminum oxide, aluminum hydroxide, talc, satin white, barium sulfate, calcium sulfate, mica, a solid bead polymeric filler, a voided polymeric filler, a multi-voided polymeric filler, a binder-coated polymeric filler, a charged polymeric filler, and combinations thereof.

11. The composition of claim 1, wherein the filler is calcium carbonate, mica, or a combination of calcium carbonate and mica.

12. The composition of claim 1, wherein the thickener is present in an amount sufficient to achieve a shear thinnable composition that has a Brookfield viscosity of between 500,000-3,000,000 cP when not under shear conditions.

* * * * *